June 23, 1936. A. KREIDLER 2,045,191
GRADOMETER
Filed Feb. 5, 1931
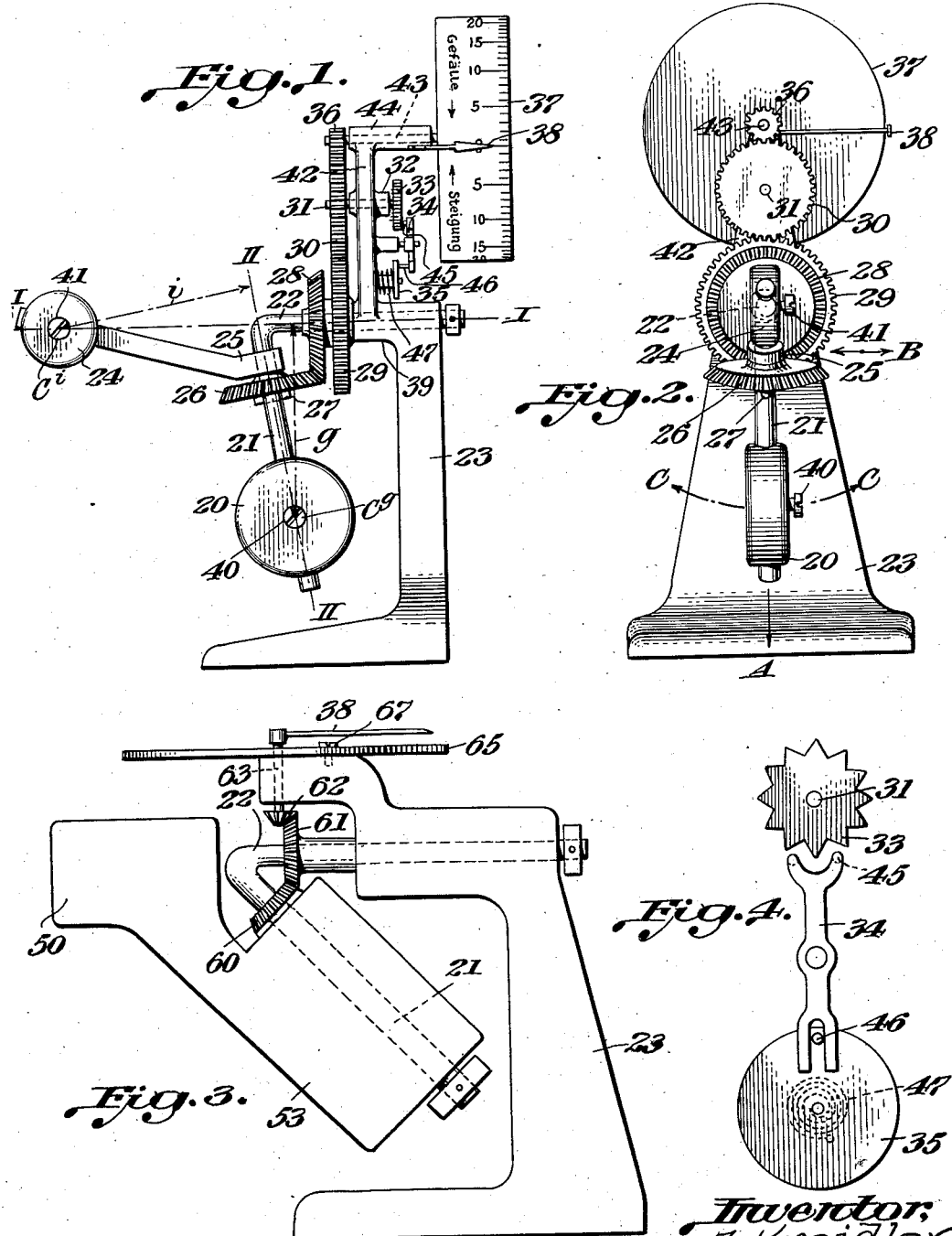
Inventor:
A. Kreidler
Glascock Downing & Seebold
By: Attys.

Patented June 23, 1936

2,045,191

UNITED STATES PATENT OFFICE 2,045,191

GRADOMETER

Alfred Kreidler, Stuttgart, Germany

Application February 5, 1931, Serial No. 513,719
In Germany February 12, 1930

12 Claims. (Cl. 33—220)

My invention relates to gradometers.

It is an object of my invention to provide a gradometer which is reliable under all conditions, and whose indications, in particular, are not influenced by inertia forces such as will occur during the acceleration and retardation periods of a vehicle on which my gradometer is mounted.

To this end, in combination with a movable gravity-responsive member, normally a pendulum, and grade-indicating means such as a dial and an indicator operatively connected to the pendulum, I provide an inertia-responsive member which may be another pendulum and is operatively connected to the gravity-responsive pendulum and to the grade-indicating means. This other pendulum adjusts the indicating means so as to correct its indications when the gravity-responsive pendulum has been moved too far by inertia force, and the error which is due to inertia forces acting on the gravity-responsive pendulum, is made up for.

The gradometers which have become known heretofore are not all adapted for use on vehicles (motor vehicles, locomotives, ships, aircraft), because it is impossible with them to exclude the considerable errors caused in the results of the measurements by the acceleration and retardation which occur on starting, braking, encountering irregularities in the road, etc. Heretofore, attempts have merely been made to overcome these errors by extensive damping of the pendulums, etc., employed. This, however, is ineffective, because the acceleration and retardation which occur during travelling are often of long duration.

This is why gradometers are not used on motor vehicles, although in regard to safety in travelling, they would be at least as valuable as the speedometers usually provided.

The invention remedies this defect by providing an instrument which may be used as a reliable gradometer under all conditions, including the acceleration and retardation periods of moving vehicles, by equipping the inclinometer, in addition to the aforesaid gravity-responsive member or pendulum, with a correction element, i. e., the aforesaid gravity-responsive member or other pendulum (or a plurality of such elements) to correct the error which is due to the action of the accelerating and retarding forces or the gravity-responsive member or pendulum so that the grade is indicated correctly when the vehicle is standing or moving at uniform speed, as well as during its acceleration and retardation periods. This correction element is so arranged in the instrument as to respond to acceleration and retardation, but not to change of inclination.

Two types of gradometers embodying my invention are illustrated by way of example in the accompanying drawing, wherein Figure 1 shows a gradometer in which the inertia-responsive member or pendulum is mounted to oscillate on the gravity-responsive member of pendulum.

Figure 2 is an end elevation of the gradometer, viewed from the left in Figure 1, and Figure 3 shows a gradometer in which the inertia-responsive member is integral with the gravity-responsive member.

Figure 4 is a detail view of the escapement mechanism forming part of the invention removed from the gradometer.

Referring now to the drawing, and first to Figs. 1 and 2, the gradometer is mounted on a bracket 23 which is secured on a vehicle (not shown) in any suitable position. A horizontal shaft 22 is mounted to turn in a bearing 39 of the bracket, and equipped with a depending tail 21 which is at an angle to vertical. Secured on the tail 21 is a weight 20. The weight 20, the tail 21 and the shaft 22 make up the gravity-responsive member or pendulum which is mounted to oscillate in the fore- and aft-direction of the vehicle, as indicated by the arrows C in Fig. 2. The expression "to oscillate" is not correct, as in fact gravity, acting in the direction of arrow A, holds the pendulum 20, 21, 22 in vertical position while the vehicle on which the pendulum is mounted, occupies various positions with respect to the pendulum, as the grade varies. However, to a person on the vehicle, the pendulum will appear to oscillate or to swing, and so these expressions will be adopted for the sake of convenience.

A bevel gear 26 is mounted to turn on the tail 21 of shaft 22, and supported by a pin or washer 27. The inertia-responsive member or pendulum, including an arm 25, and a weight 24 on the arm, is secured to bevel gear 26. The weights 20 and 24 are preferably mounted to slide on the parts by which they are supported, and fixed by screws 40 and 41, respectively, or other suitable means. The apparent oscillating or swinging movement of the inertia-responsive pendulum 24, 25 is indicated by the arrows B in Fig. 2.

A bevel gear 28 and a spur gear 29 are mounted to turn as a unit and freely on the shaft 22. The bevel gear 28 meshes with the bevel gear 26 of the inertia-responsive pendulum

24, 25. The spur gear 29 meshes with a spur gear 30 which is keyed on a lay shaft 31. The lay shaft is mounted in a bearing 32 of an upright 42 on the bracket 23. The spur gear 30 meshes with a pinion 36 on a shaft 43 in a bearing 44 at the upper end of upright 42. The shaft supports a dial cylinder 37 and the bearing 44 supports an indicator 38 which when the vehicle is on a horizontal road, points to "0", as shown in Fig. 1. Up-gradients are marked on the dial 37 below, and down-gradients are marked above, the "0".

A regulating escapement mechanism is operatively connected to the gearing from bevel gear 26 to dial 37, as will now be described: A ratchet wheel 33 is keyed on the lay shaft 31 and adapted to alternately engage two pins 45 at the upper forked end of a double-armed lever 34 which is mounted to oscillate on the upright 42. The lower end of the lever 34 is slotted for the reception of a pin 46 on a member 35 to which a spring 47 is connected. The escapement mechanism is similar to the balance-wheel escapement of clock work.

It will appear from Fig. 1 that the centre of gravity $Ci$ of the inertia-responsive pendulum 24, 25 is in the extension of the axis I—I of shaft 22. The effective length of the inertia-responsive pendulum 24, 25, i. e. the distance $i$ of its centre of gravity $Ci$ at right angle to the axis II—II of the gravity-responsive pendulum 20, 21, is equal to the effective length of the gravity-responsive pendulum 20, 21, i. e. to the distance $g$ of its centre of gravity $Cg$ at right angle to the axis I—I of shaft 22. Therefore, the number of oscillations performed by each pendulum per unit of time, say, per minute, is equal to the number performed by the other pendulum in the same period.

Equal numbers of oscillation may also be obtained by other means than by the equal effective lengths $i$ and $g$. Thus in Figs. 1 and 2, the weights 20 and 24 are not of the same size, and so their aerodynamic resistance is different. This may be utilized for obtaining equal numbers of oscillations if the effective lengths $i$ and $g$ are not equal.

The plane of oscillation of the gravity-responsive pendulum 20, 21, 22 is in the axis II—II, but the plane of oscillation of the inertia-responsive pendulum 24, 25 is not in the axis I—I but at right angles to the inclined axis II—II of the gravity-responsive pendulum. In other words: The inertia-responsive pendulum 24, 25 is mounted to oscillate in a plane extending at an angle to the plane of oscillation II—II of the gravity-responsive pendulum 20, 21, 22.

Since the tail 21, and therefore also the axis II—II, is inclined to vertical, the weight 24 returns the inertia-responsive pendulum 24, 25 into its central or initial position automatically and without the assistance of springs or other returning means. However, such means may be provided if desired. If the axis II—II of pendulum 20, 21 were at right angles to the axis I—I of shaft 22, the weight 24 would not return automatically and therefore extra means must be provided for returning it.

The operation of my gradometer is as follows:
When the grade of the road varies while the vehicle moves at uniform speed, i. e., without acceleration or retardation, the gravity-responsive pendulum 20, 21, 22 swings to the right or to the left in Fig. 2 and, through the gearing described, turns the dial 37 clockwise for a down-gradient, and anti-clockwise for an up-gradient. The inertia-responsive pendulum 24, 25 does not swing about the axis II—II as there are no inertia forces, and the bevel gear 26 does not turn. It is as if the bevel gear 26 were keyed on the tail 21.

Now, suppose that the vehicle is accelerated or retarded. For instance, when the brake is applied, inertia will cause both pendula to fly out (apparently) in forward direction, say, to the left in Fig. 2 if the vehicle moves from the right to the left. Obviously, the indication of the dial 37 is wrong as it is influenced by gravity and inertia, and not by gravity only, and therefore it requires correction. This is effected by the swinging-out of the inertia-responsive pendulum 24, 25 and the turning of bevel gear 26 which results therefrom. The pendulum 24, 25 rotates the bevel gear 28 in opposite direction to that in which it would rotate under the influence of gravity-responsive pendulum 20, 21 only, as described, and the excess of movement in this direction is made up for by the movement in opposite direction imparted by the pendulum 24, 25, so that the resultant movement of dial 37 is such as if there had been no inertia forces whatever, and the grade is indicated correctly.

The two pendula, being of equal effective length and having the same rate of oscillation, as described, normally move in exact synchronism, but it may occur that they fall out of step, and in this case the escapement mechanism becomes active. For instance, if one of the pendula does not move in synchronism with the other pendulum, the movement it transmits to the gearing is arrested for the present by the escapement mechanism stopping temporarily the bevel gear 28 so that the bevel gear of the inertia-responsive pendulum, 26, rolls on the stationary bevel gear 28. By these means, synchronous operation of the two pendula is enforced. When, however, the torque acting on the gearing is exerted for a longer period, say, in consequence of a variation of the grade, the escapement mechanism permits slow turning of scale 37.

Referring now to Fig. 3, the weights 20 and 24 are combined into a single unit, the part 53 being the gravity-responsive weight, and the part 50 being the inertia-responsive weight which is cast integral with the part 53. The unit is mounted to turn on the tail 21 of shaft 22 and this movement corresponds to the turning of arm 25 on the tail. The complete unit swings about shaft 22, like the weight 20. A bevel gear 60 is attached to the part 53 in line with the axis of tail 21. This bevel gear meshes with a bevel gear 61 which, like the bevel gear 28, is free to turn on shaft 22. A third bevel gear 62 meshes with bevel gear 61 and is keyed on the lower end of indicator shaft 63 on which the indicator 38 is mounted. 65 is a fixed dial which is held on bracket 23 by a screw 67.

The operation of the gradometer is similar to that of the one shown in Figs. 1 and 2, the only difference being that while in Figs. 1 and 2 the inertia-responsive member, the pendulum 24, 25, is free to turn with respect to the weight 20 which is held against turning on the tail 21, the two weights 53 and 50 turn together about the tail 21 in Fig. 3. The weight 53 is gravity-responsive and operates like the weight 20, while the weight 50 is inertia-responsive and operates like the weight 24 to correct the indications on scale 65 if they have been influenced by inertia.

I claim:
1. In a gradometer, a support, a movable gravity-responsive member mounted in said sup- port, grade-indicating means operatively connected to said gravity-responsive member, and a movable inertia-responsive member operatively connected to said gravity-responsive member and to said grade-indicating means, for adjusting said grade-indicating means to correct the error which is due to inertia forces acting on said gravity-responsive member, the center of gravity of said inertia-responsive member being substantially in line with the axis of movement of the gravity-responsive member.

2. In a gradometer, a support, a gravity-responsive pendulum mounted in said support, grade-indicating means operatively connected to said pendulum, and a movable inertia-responsive member mounted to move in a plane extending at an angle to the plane of oscillation of said pendulum and operatively connected to said pendulum and to said grade-indicating means, for adjusting said grade-indicating means to correct the error which is due to inertia forces acting on said pendulum, the center of gravity of said inertia-responsive member being substantially in line with the axis of movement of said gravity-responsive pendulum.

3. In a gradometer, a support, a gravity-responsive pendulum mounted in said support, grade-indicating means operatively connected to said pendulum, and a movable inertia-responsive member mounted to oscillate about an axis inclined to vertical, and in a plane extending at an angle to the plane of oscillation of said pendulum, and operatively connected to said pendulum and to said grade-indicating means, for adjusting said grade-indicating means to correct the error which is due to inertia forces acting on said pendulum, the center of gravity of said inertia-responsive member being substantially in line with the axis of movement of said gravity-responsive pendulum.

4. In a gradometer, a support, a gravity-responsive pendulum mounted in said support, grade-indicating means operatively connected to said pendulum, and a movable inertia-responsive member mounted to move in a plane extending at an angle to the plane of oscillation of said pendulum and operatively connected to said pendulum and to said grade-indicating means, for adjusting said grade-indicating means to correct the error which is due to inertia forces acting on said pendulum, the center of gravity of said inertia-responsive member being substantially in line with the axis of movement of said gravity-responsive pendulum.

5. In a gradometer, a support, a gravity-responsive pendulum mounted in said support, grade-indicating means operatively connected to said pendulum, and a movable inertia-responsive member mounted to oscillate on said pendulum in a plane extending at an angle to the plane of oscillation of said pendulum and operatively connected to said pendulum and to said grade-indicating means, for adjusting said grade-indicating means to correct the error which is due to inertia forces acting on said pendulum, the center of gravity of said inertia-responsive member being substantially in line with the axis of movement of said gravity-responsive pendulum.

6. In a gradometer, a support, a shaft mounted in said support, a tail extending from said shaft at an angle to vertical, and a weight on said tail; said shaft, tail and weight making up a gravity-responsive pendulum, grade-indicating means operatively connected to said gravity-responsive pendulum, an arm mounted to oscillate about said tail, and a weight on said arm; said arm and weight making up an inertia-responsive pendulum which is mounted to oscillate in a plane extending at an angle to the plane of oscillation of said gravity-responsive pendulum, and operatively connected to said gravity-responsive pendulum and to said grade-indicating means, for adjusting said grade-indicating means to correct the error which is due to inertia forces acting on said gravity-responsive pendulum, the center of gravity of said inertia-responsive pendulum being substantially in line with the axis of movement of the gravity-responsive pendulum.

7. In a gradometer, a support, a shaft mounted in said support, a tail extending from said shaft at an angle to vertical, and a weight on said tail; said shaft, tail and weight making up a gravity-responsive pendulum, grade-indicating means operatively connected to said gravity-responsive pendulum, an arm mounted to oscillate about said tail, and a weight on said arm whose center of gravity is substantially in the extended axis of said shaft; said arm and weight making up an inertia-responsive pendulum which is mounted to oscillate in a plane extending at an angle to the plane of oscillation of said gravity-responsive pendulum, and operatively connected to said gravity-responsive pendulum and to said grade-indicating means, for adjusting said grade-indicating means to correct the error which is due to inertia forces acting on said gravity-responsive pendulum.

8. In a gradometer, a support, a shaft mounted in said support, a tail extending from said shaft at an angle to vertical, and a weight on said tail; said shaft, tail and weight making up a gravity-responsive pendulum, grade-indicating means operatively connected to said gravity-responsive pendulum, an arm mounted to oscillate about said tail, and a weight on said arm; said arm and weight making up an inertia-responsive pendulum whose damping is different from the damping of said gravity-responsive pendulum, and which is mounted to oscillate in a plane extending at an angle to the plane of oscillation of said gravity-responsive pendulum, and operatively connected to said gravity-responsive pendulum and to said grade-indicating means, for adjusting said grade-indicating means to correct the error which is due to inertia acting on said gravity-responsive pendulum the center of gravity of said inertia responsive pendulum being substantially in line with the axis of movement of the gravity responsive pendulum.

9. In a gradometer, a support, a shaft, mounted in said support, a tail extending from said shaft at an angle to vertical, and a weight on said tail; said shaft, tail and weight making up a gravity-responsive pendulum, grade-indicating means operatively connected to said gravity-responsive pendulum, an arm mounted to oscillate about said tail, and a weight on said arm; said arm and weight making up an inertia-responsive pendulum whose effective length is equal to that of said gravity-responsive pendulum, and which is mounted to oscillate in a plane extending at an angle to the plane of oscillation of said gravity-responsive pendulum, and operatively connected to said gravity-responsive pendulum and to said grade-indicating means, for adjusting said grade-indicating means to correct the error which is due to inertia acting on said gravity-responsive pendulum the center of gravity of said inertia responsive pendulum being substantially in line with the axis of movement of the gravity responsive pendulum.

10. In a gradometer, a support, a movable gravity-responsive member mounted in said support, grade-indicating means, mechanism operatively connecting said gravity-responsive member to said indicating means, a movable inertia-responsive member operatively connected to said gravity-responsive member and to said mechanism, for adjusting said grade-indicating means to correct the error which is due to inertia forces acting on said gravity-responsive member, and a regulating escapement mechanism operatively connected to said mechanism.

11. In a gradometer, a support, a movable gravity-responsive member mounted in said support, grade-indicating means operatively connected to said gravity-responsive member, and an inertia-responsive member which is on said gravity-responsive member and through said gravity-responsive member, is operatively connected to said grade-indicating means, for adjusting said grade-indicating means to correct the error which is due to inertia forces acting on said gravity-responsive member the center of gravity of said inertia responsive member being substantially in line with the axis of movement of the gravity responsive member.

12. In a gradometer, a shaft, a tail extending from said shaft at an angle to vertical, a gravity-responsive weight mounted to turn on said tail, and an inertia-responsive weight which is on said gravity-controlled weight, and, through said gravity-controlled weight, is operatively connected to said grade indicating means, for adjusting said grade-indicating means to correct the error which is due to inertia forces acting on said gravity-responsive weight the center of gravity of said inertia weight being substantially in line with the axis of said shaft.

ALFRED KREIDLER.